(12) United States Patent
Rossi et al.

(10) Patent No.: US 8,756,038 B2
(45) Date of Patent: Jun. 17, 2014

(54) METHOD, SYSTEM AND APPARATUS FOR MODELING PRODUCTION SYSTEM NETWORK UNCERTAINTY

(75) Inventors: David J. Rossi, Katy, TX (US); Marcus Suzart Ungaretti Rossi, Bahia (BR)

(73) Assignee: Schlumberger Technology Corporation, Sugar Land, TX (US)

(*) Notice: Subject to any disclaimer, the term of this patent is extended or adjusted under 35 U.S.C. 154(b) by 675 days.

(21) Appl. No.: 12/897,029

(22) Filed: Oct. 4, 2010

(65) Prior Publication Data

US 2011/0144965 A1 Jun. 16, 2011

Related U.S. Application Data

(60) Provisional application No. 61/248,525, filed on Oct. 5, 2009.

(51) Int. Cl.
*G06F 7/60* (2006.01)
*G06G 7/48* (2006.01)

(52) U.S. Cl.
USPC .................................. 703/2; 703/10

(58) Field of Classification Search
None
See application file for complete search history.

(56) References Cited

U.S. PATENT DOCUMENTS

| | | | |
|---|---|---|---|
| 5,486,762 A | 1/1996 | Freedman et al. | |
| 5,539,704 A | 7/1996 | Doyen et al. | |
| 6,549,854 B1 | 4/2003 | Malinverno | |
| 6,980,940 B1 | 12/2005 | Gurpinar | |
| 7,054,752 B2 | 5/2006 | Zabalza-Mezghani | |
| 7,366,616 B2 * | 4/2008 | Bennett et al. | 702/9 |
| 7,460,957 B2 | 12/2008 | Prange et al. | |
| 7,478,024 B2 | 1/2009 | Gurpinar | |
| 8,185,313 B2 | 5/2012 | Houck | |
| 2007/0118346 A1 * | 5/2007 | Wen et al. | 703/10 |
| 2007/0179742 A1 | 8/2007 | Tabanou | |
| 2008/0162099 A1 | 7/2008 | Vega Velasquez | |
| 2008/0162100 A1 | 7/2008 | Landa | |

(Continued)

FOREIGN PATENT DOCUMENTS

| | | |
|---|---|---|
| GB | 2400212 | 10/2004 |
| WO | 0107755 | 2/2001 |
| WO | 2009075962 | 8/2009 |

OTHER PUBLICATIONS

Edeko F. O. et al., "Application of Bayes' Model to Oil/Gas Processing Network Failures", Corrosion 2004, New Orleans, LA. 2004 by NACE International.

(Continued)

*Primary Examiner* — Omar Fernandez Rivas
*Assistant Examiner* — Nithya J Moll

(57) ABSTRACT

Embodiments of the present disclosure include a method that includes creating a deterministic model representing a production system. The model may include one or more inputs and parameters that are not deterministically known, and one or more outputs. A prior probability density function may be used to determine a prior uncertainty, and a measurement related to a first of the outputs may be obtained. The method may also include determining a posterior probability density function using the prior probability density function, the measurement, and a conditional probability density function. Embodiments of the present disclosure also include a computer-readable medium having a set of computer-readable instructions residing thereon that, when executed, perform acts comprising the foregoing method. Embodiments of the present disclosure further include a computing device that includes a memory, one or more processors operatively coupled to the memory, and functionality operable by the processors to perform the foregoing method.

20 Claims, 13 Drawing Sheets

(56) References Cited

U.S. PATENT DOCUMENTS

| | | |
|---|---|---|
| 2008/0172272 A1 | 7/2008 | Back |
| 2009/0182509 A1* | 7/2009 | Kimminau et al. ............. 702/11 |
| 2011/0144965 A1 | 6/2011 | Rossi et al. |

OTHER PUBLICATIONS

Tipping, D.E., et al., "Enhancing Field Management in Siberia by Quantifying Production Uncertainties", 2006 SPE Russian Oil and Gas Technical Conference and Exhibition, Moscow, Russia, Oct. 3-6, 2006, SPE 101808.

Noevdal, Geir, et al., "Reservoir Monitoring and Continuous Model Updating Using Ensemble Kalman Filter", First presented 2003 SPE Annual Technical Conference and Exhibition, Denver, Colorado, USA, Oct. 5-8, 2003, publication Mar. 2005 SPE Journal, pp. 66-74.

Malinverno, Alberto, et al., "Expanded Uncertainty Quantification in Inverse Problems: Hierarchical Bayes and Empirical Bayes", Geophysics, vol. 69, No. 4 (Jul.-Aug. 2004), pp. 1005-1016.

Malinverno, Alberto, et al., "Integrating Diverse Measurements to Predict Pore Pressure With Uncertainties While Drilling", SPE Annual Technical Conference and Exhibition, Houston, Texas, USA, Sep. 26-29, 2004, SPE 90001.

Bouska, et al., "Validating Reservoir Models to Improve Recovery", Oil Review, 1999, pp. 21-35.

Busby, et al., "Uncertainty in Flow in Porous Media", In Final Reports (pp. D1-D26); 49th European Study Group with Industry, University of Oxford, Mar. 29-Apr. 2, 2004, 2004, 216 pages.

Cozman, Fabio, "Robustness analysis of Bayesian networks with local convex sets of Distributions", Proceedings of the Thirteenth Conference on Uncertainty in Artificial Intelligence (UAI1997), 1997, pp. 108-115.

El Ouair, et al., "Integrated Reservoir Management Approach: From Time-Lapse Acquisition to Reservoir Model Update at the Norne Field", International Petroleum Technology Conference, Nov. 21-23, 2005, IPTC, 10894, Doha, Qatar, 2005, pp. 1-6.

Jin, "Joint Estimation of Porosity and Saturation by Combining a Rock Physics Model and Constrained Pre-stack Seismic Waveform Inversion", SEG/San Antonio 2007 Annual Meeting, 2007, pp. 1957-1961.

Jin, et al., "Stochastic Inversion for Reservoir Properties Using Parallel Learning-Based VFSA and Pilot Point Parameterization", SPE 118818, Feb. 2009, pp. 1-8.

Johnson, et al., "Chapter 3: CTD and Related Measurements", Bermuda Atlantic Time-series Study, 1997, pp. 7-22.

Moitra, et al., "A Field-wide Integrated Production Model and Asset Management System for the Mumbai High Field", OTC 18678—Offshore Technology Conference, Houston, Texas, 2007, pp. 1-12.

Paab, et al., "MESA: Maximum Entropy by Simulated Annealing", UAI (Uncertainty in Artificial Intelligence), 1991, pp. 230-237.

Sachenko, et al., "Sensor Drift Prediction Using Neural Networks", International Workshop on Virtual and Intelligent Measurement Systems, Apr. 29-30, 2000, Annapolis, MD, 2000, pp. 88-92.

Skjervheim, et al., "Incorporating 4D Seismic Data in Reservoir simulation Models Using Ensemble Kalman Filter", SPE 95789, 2005, pp. 1-10.

Uturbey, "Identification of ARMA Models by Bayesian Methods Applied to Streamflow Data", 9th Int. Conf. Probabilistic Methods Applied to Power Systems, KTH, Stockholm, 2006, pp. 1-7.

Van Trees, Harry, "Detection, Estimation, and Modulation Theory, Part I. Detection, Estimation, and Modulation Theory", Wiley-Interscience Publication, John Wiley & Sons, Inc., 2001, p. 92.

* cited by examiner

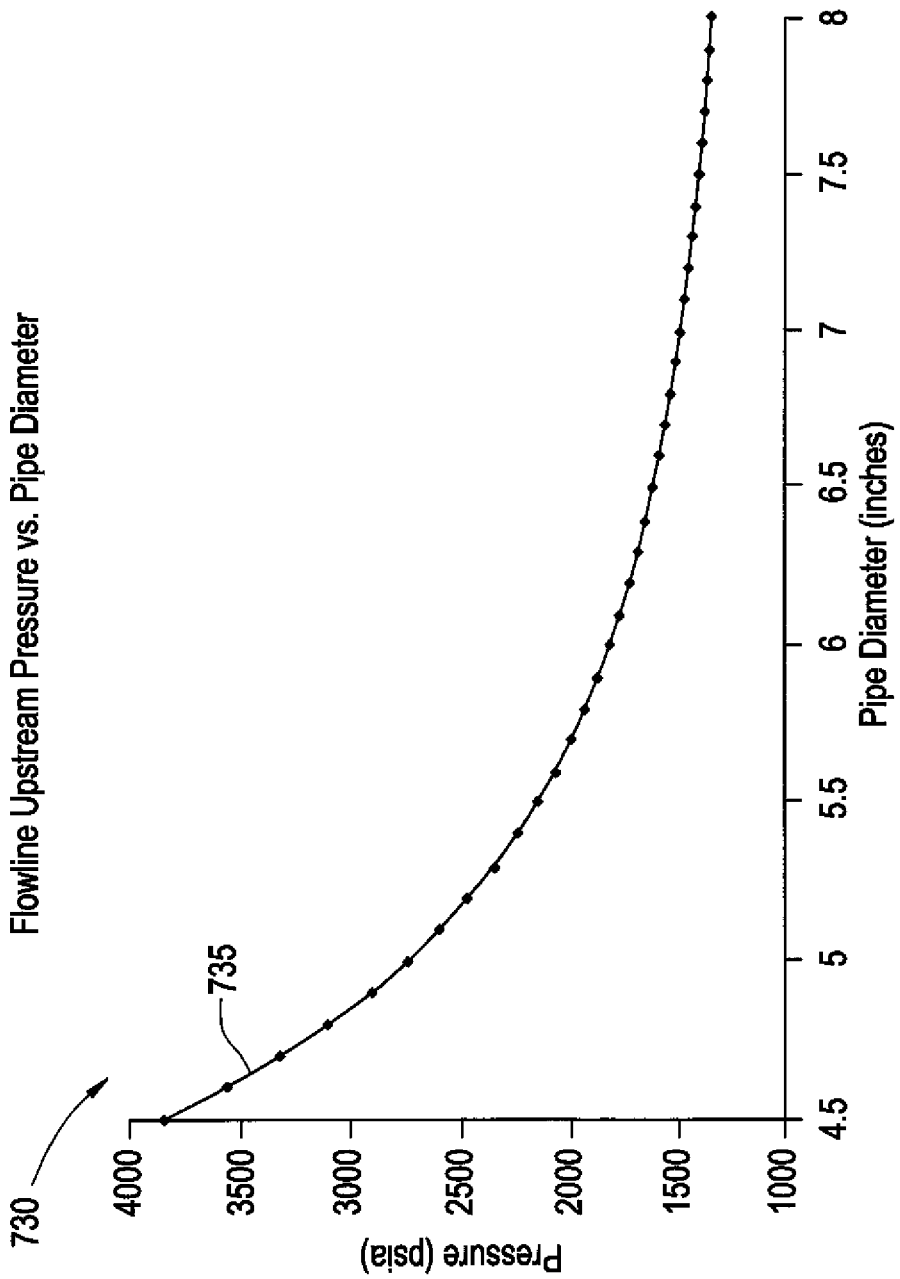

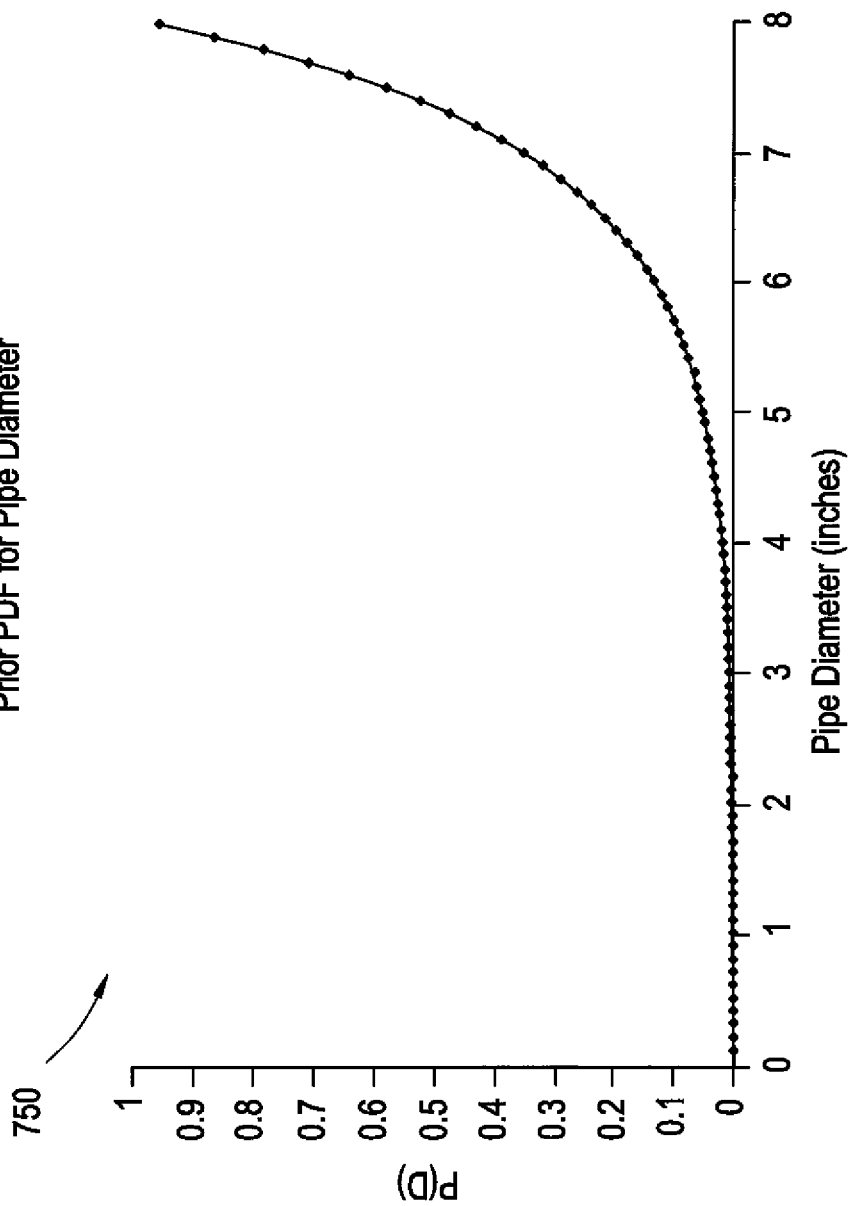

Posterior PDF for Pipe Diameter

METHOD, SYSTEM AND APPARATUS FOR MODELING PRODUCTION SYSTEM NETWORK UNCERTAINTY

RELATED APPLICATIONS

This patent application claims the benefit of priority to U.S. Provisional Patent Application No. 61/248,525 to David J. Rossi, filed Oct. 5, 2009, and incorporated herein by reference in its entirety.

BACKGROUND

Oil and gas industries have used mathematical predictive models to represent production systems, including wells, subsea and/or surface networks and facilities. Models range from "black oil" to compositional models, and from steady state to transient models. When calibrated with available measurement data, such models can be used to estimate fluid properties and dynamic flow conditions throughout a system. For example, such models may be used to estimate the temperature, pressure and flow rates along the fluid journey. This in turn allows operators to understand potential system problems, such as flow restrictions due to solids buildup, and water and/or condensate buildup in gas lines.

Oil and gas reservoirs may be modeled using non-deterministic methods. For example, geostatistical simulation has been used to capture uncertainty via collections of equal probability realizations (specifically, these methods incorporate uncertainty by varying uncertain parameters, generating a collection of models that all satisfy the available measurements, e.g., seismic, geological, well logs, production history, etc.). Other methods, such as ensemble Kalman Filtering, may also be used to represent model uncertainty and to continuously update reservoir models.

Bayesian techniques may be applied to represent uncertainty in subsurface pore pressure related to seismic, acoustic and other data. However, Bayesian techniques have not been used in conventional methods to provide a continuous update of the uncertainty of models for oil and gas production systems.

Conventional methods, systems, and apparatuses for modeling oil and gas reservoirs, wells, networks and facilities are not ideal in all respects. Thus, there is a need for using non-deterministic techniques, such as Bayesian techniques, to represent uncertainties and provide continuous update of models for oil and gas wells, networks and facilities.

SUMMARY

In one or more implementations, modeling production system network uncertainty relates to a method of modeling a production system. The method includes creating a deterministic model representing the production system. The deterministic model may include one or more inputs and parameters that are not deterministically known, and one or more outputs. The method may further include a prior probability density function that may be used to determine a prior uncertainty, and a measurement related to a first of the outputs that may be obtained. The method may also include obtaining a measurement related to a first of the outputs, where the first of the outputs is assumed to have a measurement uncertainty that is determined using a conditional probability density function, and where the conditional probability density function is conditioned on the one or more inputs or parameters that are not deterministically known. The method may also include determining a posterior probability density function using the prior probability density function, the measurement, and a conditional probability density function.

Other aspects of modeling production system network uncertainty will be apparent from the following description and the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. The same numbers are used throughout the drawings to reference like features and components.

FIGS. 7A-7D illustrate a model and charts related to a Bayesian probability updating computation according to an embodiment of the present disclosure.

DETAILED DESCRIPTION

Management of oil and gas assets may include performing certain activities, such as modeling wells, pipeline networks and surface facilities (both offshore and onshore). Simulators, such as PIPESIM software (developed and distributed by SCHLUMBERGER), PROSPER/GAP (developed and distributed by PETROLEUM EXPERTS), OLGA software (developed and distributed by SPT GROUP), or LEDAFLOW (developed and distributed by KONGSBERG) may be used to model such assets. The objective of such modeling activities may include predicting the pressure, temperature and flow rates (i.e., oil, water, gas) throughout a system.

Mathematical models of wells, networks and facilities may be created using modeling software. For example, PIPESIM software may be used to create steady state models. Further, OLGA software may be used to create transient models. Finally HYSYS software (developed and distributed by ASPENTECH), or UNISIM (developed and distributed by HONEYWELL) may be used to create facilities models.

Generally, any one of the foregoing models may be referred to herein as a "production system model", or as simply a "model."

Production system models may be deterministic. That is, for a given set of input variables, the model may generate a single output prediction set. However, in practice, oil and gas wells, networks and facilities might not always be unambiguously described with a deterministic model. In such cases, other methods may be needed to capture intrinsic uncertainty in the system models.

Some embodiments of the present disclosure may use probability density functions to represent uncertainty associated with modeling wells, networks and facilities. Furthermore, some embodiments of the present disclosure may use Bayesian techniques to recursively update the probability density function (PDF) as new measurements become available.

Figure 1:
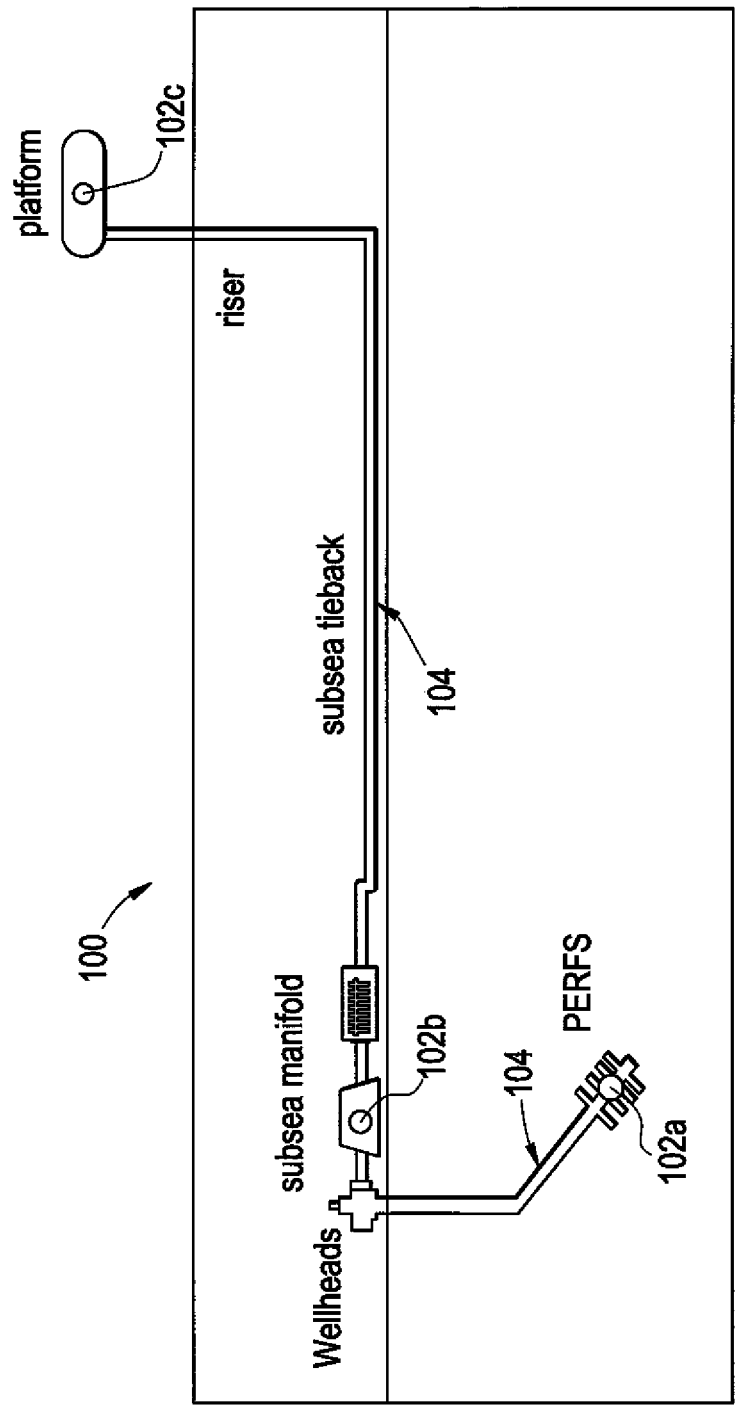
FIG. 1 illustrates a schematic view of an off-shore production system according to an embodiment of the present disclosure.

FIG. 1 schematically illustrates an exemplary off-shore production system 100. The production system branch 100 represents a system in a seawater environment. Points 102a-c represent various points along the fluid path 104. For example, 102a is a point at the reservoir, 102b is a point at the subsea manifold, and 102c is a point at the platform (more specifically at the separator).

Figure 2:
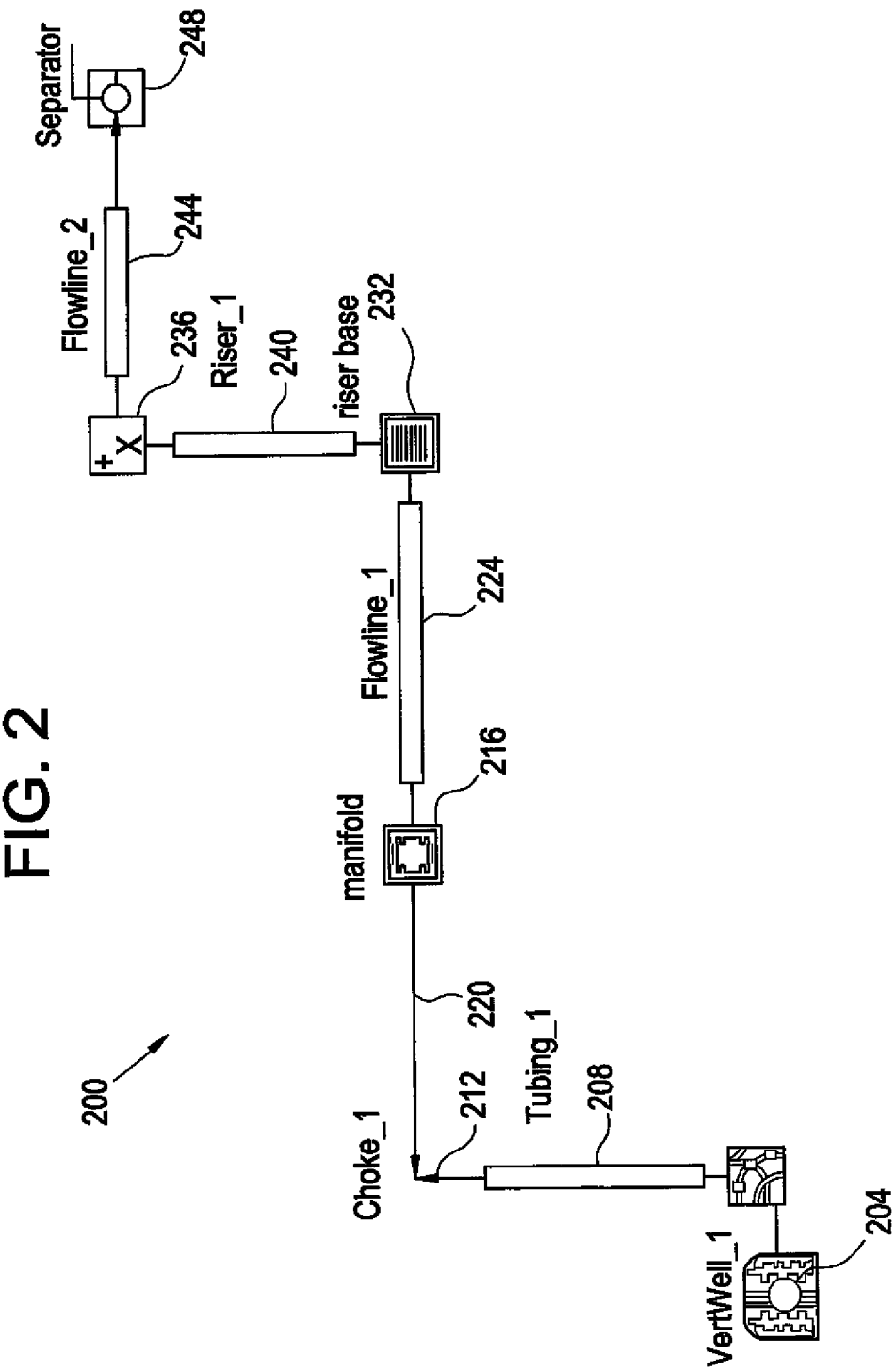
FIG. 2 illustrates a schematic view of a production system model according to an embodiment of the present disclosure.

FIG. 2 illustrates an exemplary production system model 200 based on the system branch 100 shown in FIG. 1. The model 200 was generated using PIPESIM software. However, in other embodiments, other software may be used to create the model 200, as mentioned above.

The model 200 includes a well completion 204, which is coupled to tubing 208. The tubing 208 is coupled to a choke 212, which is in turn coupled to a report tool representing a manifold 216 via a connector 220. A subsea flowline 224 couples the manifold 216 with another reporting tool representing the riser base 232. The riser base 232 is coupled to a multiplier that represents the platform input 236 via a riser 240. Further, a topside flowline 244 couples the platform input 236 to a separator 248. In other embodiments, the topside flowline 244 provides fluid to any component of a process facility known in the art. The model 200 is merely representative, and it should be appreciated that the model 200 may include any other elements known in the art.

Figure 3:
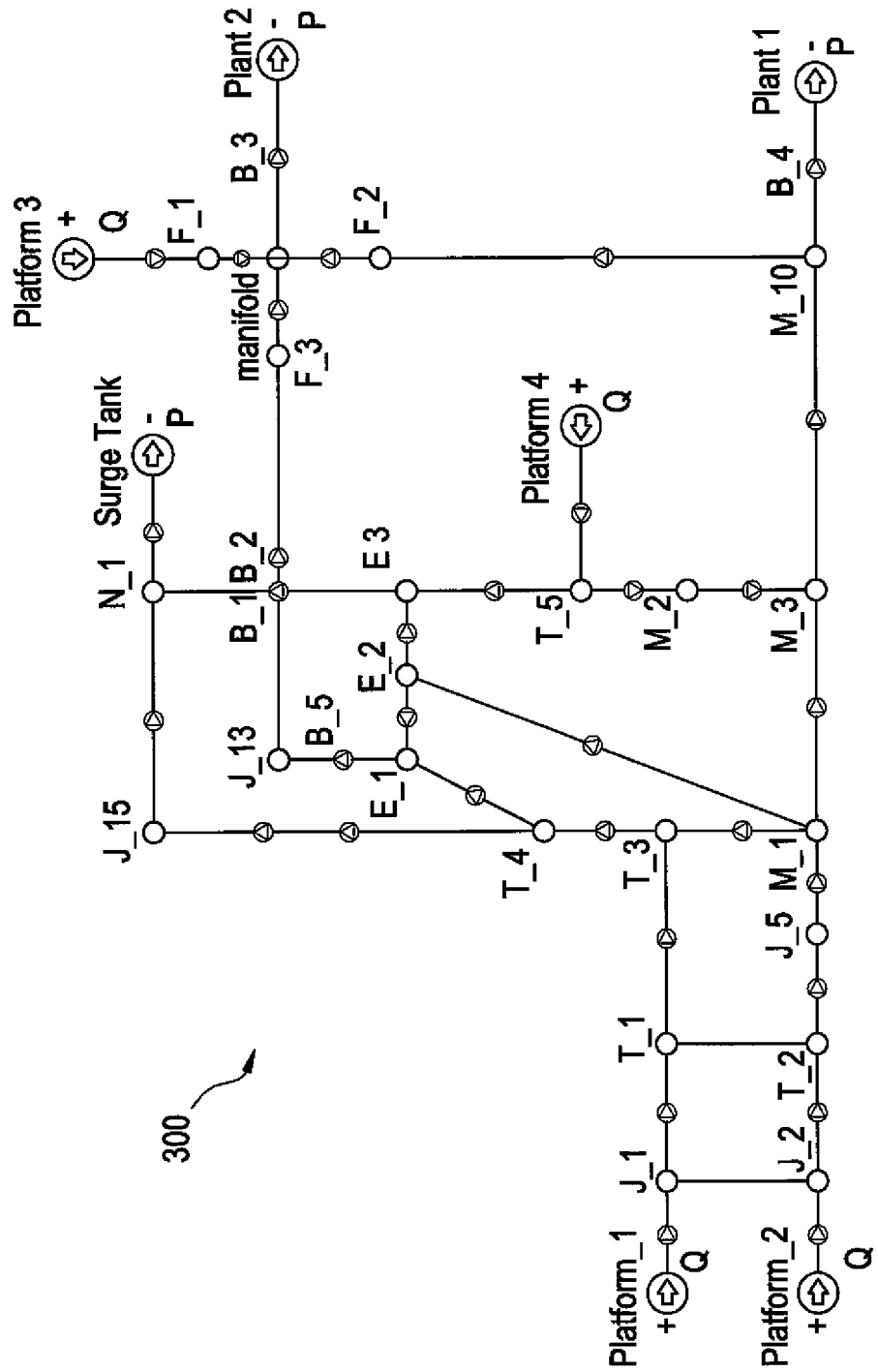
FIG. 3 illustrates a schematic view of a production system network model according to an embodiment of the present disclosure.

PIPESIM software can also be used to model networks that include multiple interconnecting branches having one or more loops, such as the network shown in FIG. 3. FIG. 3 is a schematic view of a multi-branch production system network model 300. The model 300 includes multiple interconnecting branches with loops. Embodiments of the present disclosure may be used with single branch models, such as model 200, or more complex models, such as model 300.

Figure 4:
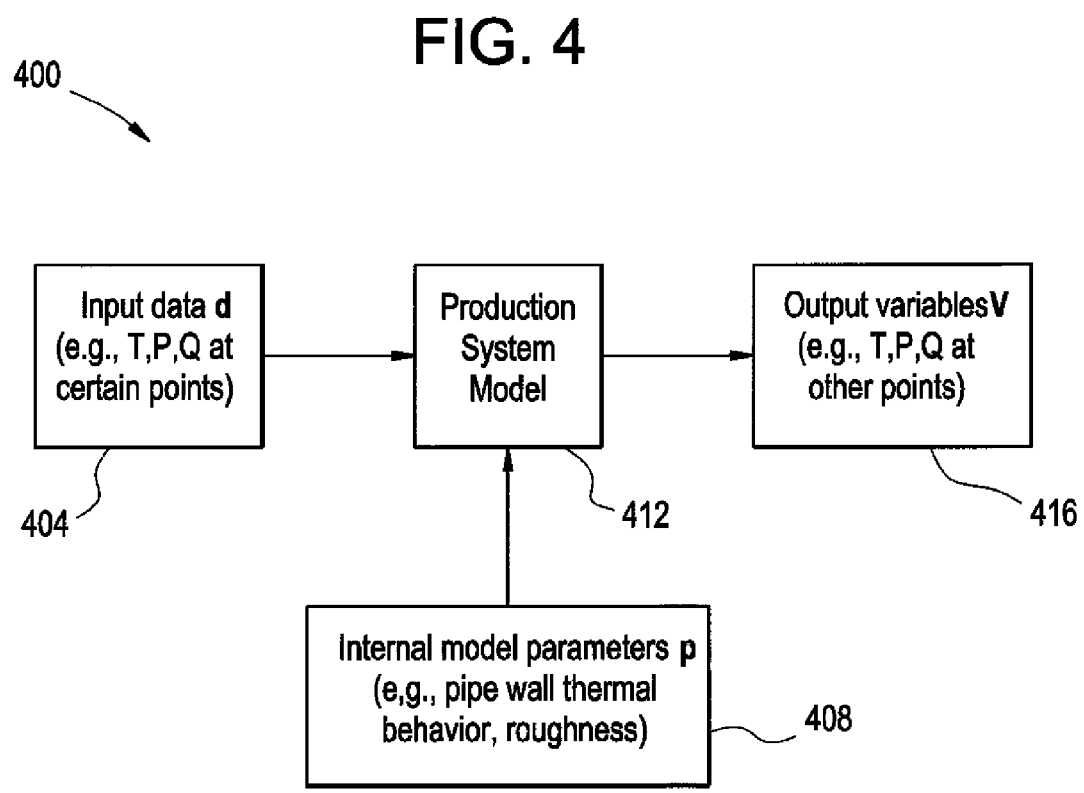
FIG. 4 illustrates a production system mathematical model according to an embodiment of the present disclosure.

FIG. 4 is a schematic illustration of a mathematical model 400 for a production system. In the mathematical model 400, the data flux diagram is presented with the following elements, input data 404 (represented in FIG. 4 and herein as "d"), and model parameters 408 (represented in FIG. 4 and herein as "p") are provided to a production system model 412 to produce output variables 416 (represented in FIG. 4 and herein as "v").

Input data 404 may include temperature, pressure and/or flow rate data at certain points within a system (e.g., systems 200, 300). For example, if the system was represented by model 200 shown in FIG. 2, then input data 404 may include the reservoir pressure for well completion 204, and the pressure at the input to the separator 248. In other embodiments of the present disclosure, other input data 404 may be provided to the production system model 412.

Model parameters 408 may provide a characterization of the fluid, reservoir, completion and production equipment. For example, model parameters 408 may be based on appropriate fluid properties, such as composition and PVT properties. In addition, model parameters 408 may also include a description and characteristics of various model elements (e.g., reservoir, pipelines, tubing and risers). For example, the description and characteristics may include formation productivity index, pipe length, pipe inner diameter, wall thickness, roughness and thermal conductivity, choke bean size, separator efficiency, ambient temperature, and choice of empirical multiphase flow correlation "relationships". In other embodiments, model parameters 408 may include descriptions and characteristics of other elements of a system.

Output variables 416 may be determined using production system model 412 with input data 404 and model parameters 408. In an embodiment, output variables 416 may include determinations of temperature, pressure and/or flow rate at various points throughout a system. For example, with respect to model 200 shown in FIG. 2, model outputs 416 might include prediction of the flow rate and temperature on the separator 204. In another embodiment, output variables 416 may include predictions of temperature, pressure and/or flow rate at other points throughout the system.

A relationship between the model input data 404, parameters 408, and output variables 416 may be mathematically represented using the following nonlinear equation: $v=f(d, p)$ (herein referenced as "Eqn. 1").

In Eqn. 1, "v" may represent a vector or set of values of output variables 416; "f" may represent a relationship; "d" may represent a vector or set of values of input data 404; and "p" may represent a vector or set of values of model parameters 408. The foregoing equation is deterministic. That is, for the same set of values representing the inputs d and p, this deterministic model predicts a unique and repeatable value for the output variables v.

Figure 5:
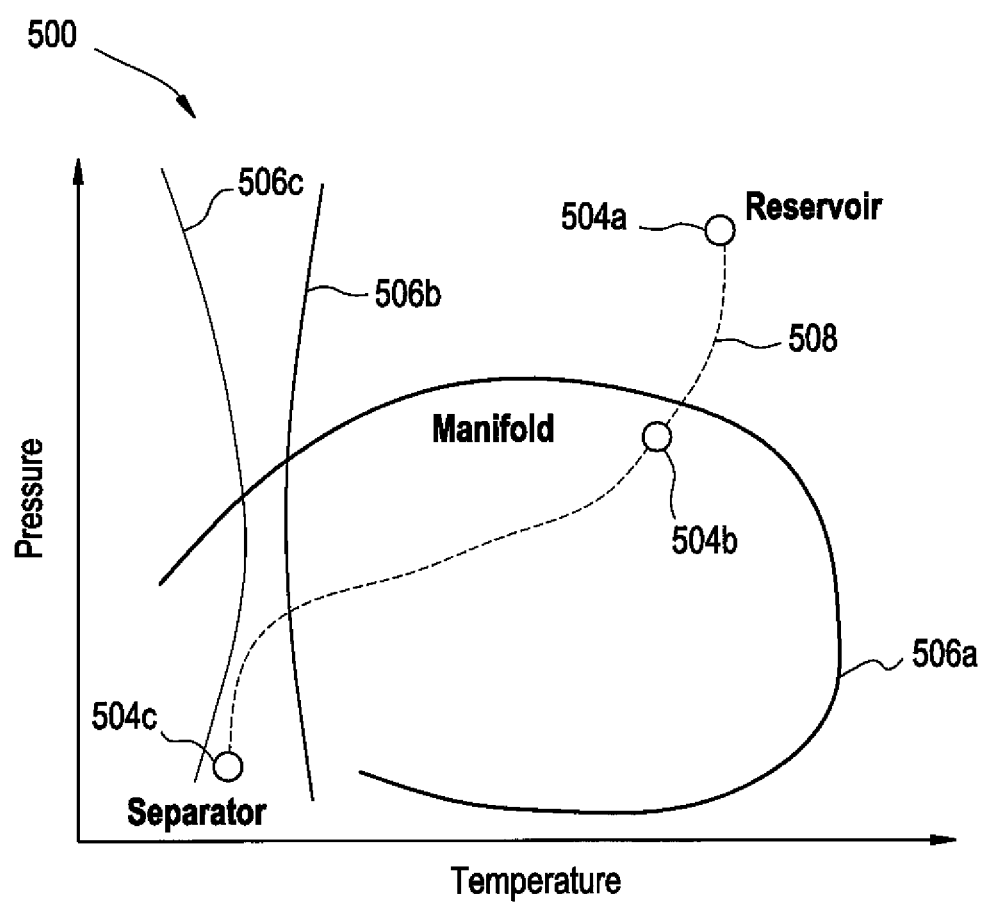
FIG. 5 illustrates a chart of pressure-temperature phase envelopes and operating profile according to an embodiment of the present disclosure.

FIG. 5 illustrates a chart 500 of pressure-temperature phase envelopes and operating profile according to an embodiment of the present disclosure. A production system model, such as models 200 and 300 shown in FIGS. 2 and 3 respectively, may be used to predict and analyze the behavior of multiphase fluid flow through subsea flow lines and risers, such as subsea flow line 224 and riser 240, shown in FIG. 2.

Deterministic production system modeling may be used to predict the pressures and temperatures (P,T) of fluid in the model 200 at various points along the model 200. (P,T) at the reservoir 504a, manifold 504b, and separator 504c are shown on the chart 500. Various phase envelopes are also illustrated in FIG. 5. For, example, a phase envelope 506a, a wax envelope 506b, and a hydrate envelope 506c are shown in FIG. 5.

The distribution of (P,T) along the model 200, as illustrated by line 508 in FIG. 5, is referred to herein as the (P,T) operating profile. The deterministic operating profile (P,T) can be superimposed on the pressure-temperature phase envelopes (thermo-hydraulic plot), as shown by the dashed curve 508 in FIG. 5. This allows the verification of the fluid behavior at various points along a production system.

Figure 6:
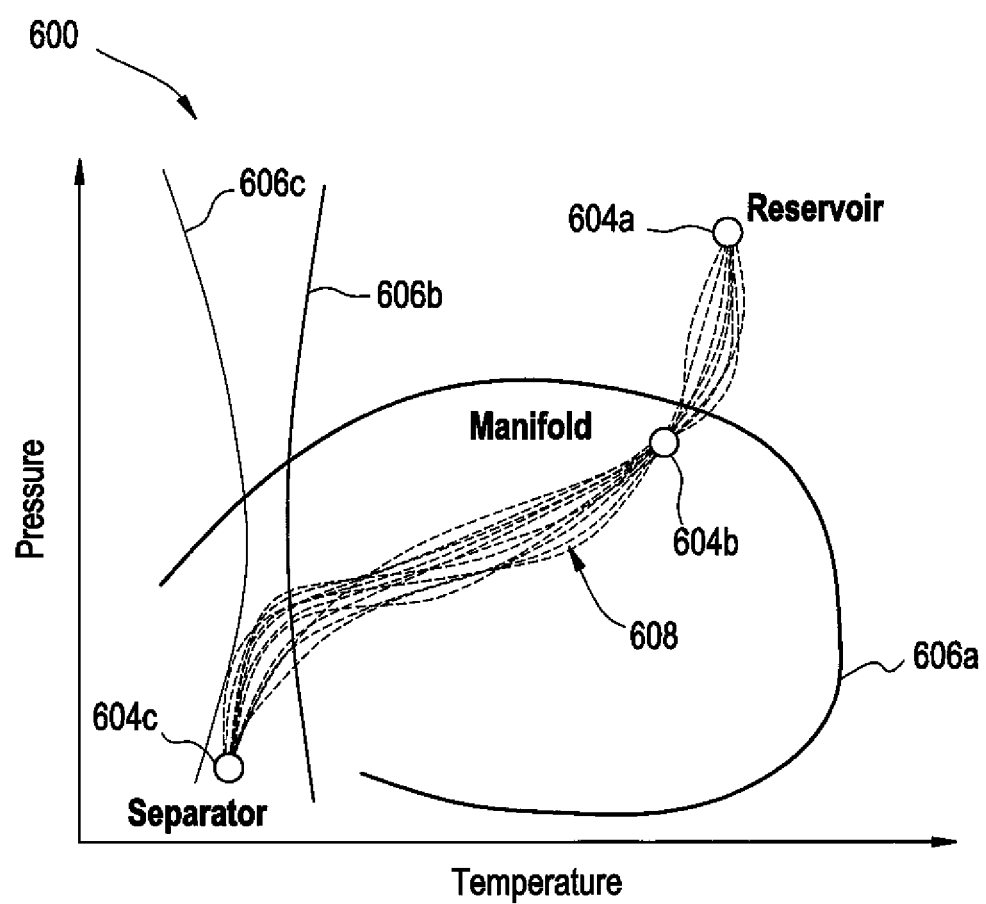
FIG. 6 illustrates a chart of pressure-temperature phase envelopes with Monte Carlo sampling of different operating profiles according to an embodiment of the present disclosure.

FIG. 6 shows a chart 600 illustrating pressure-temperature phase envelopes with Monte Carlo sampling of different operating profiles according to an embodiment of the present disclosure. The operating profile (P,T) at the reservoir 604a, manifold 604b, and separator 604c are shown on the chart 600. Again, a phase envelope 606a, a wax envelope 606b, and a hydrate envelope 606c are shown in FIG. 6. As discussed above, the output variables 416 ("v") shown in FIG. 4 may be determined by the equation $v=f(d, p)$. However, the determination of such output variables 416 ("v") may not be exact due to uncertainty associated with either the input data 404 ("d") or the model parameters ("p"). For example, even if the relationship "f" in equation (1) is deterministic and accurately known, the input data 404 ("d") and the model parameters 408 ("p") might not be accurately known.

According to an embodiment of the present disclosure, output variables 416 ("v"), such as temperatures, pressures and flow rates, may be predicted using production system model 412 by performing computations on available input data 404 and model parameters 408, along with their corresponding uncertainties, thereby reflecting a measure of the uncertainty of the output variables 416. The foregoing approach may also be used to show how the uncertainties of the output variables 416 ("v") depend on the uncertainties in the input data 404 ("d") and the model parameters 408 ("p").

Embodiments of the present disclosure may apply to the deterministic equation v=f(d, p), while also allowing the input data 404 ("d") and model parameters 408 ("p") to have associated uncertainties. As an example, a probabilistic approach may be used to quantify and propagate uncertainties of input data 404 ("d") and model parameters 408 ("p") to the output variables 416 ("v"). The results of this approach are not a single (i.e., deterministic) prediction of output variables 416 ("v"), such as temperatures, pressures and flow rates. Instead, the results of this approach, by taking into account all of the available input data 404 ("d") and knowledge about the model parameters 408 ("p"), provide a PDF that reflects the probability of different values of the output variables 416 ("v").

A PDF of interest related to the foregoing approach includes a conditional posterior PDF for the uncertain inputs that enter the production system model equation, after a measurement is made of the output variables 416 ("v"). Using a Bayesian approach, the posterior conditional PDF may be written as follows: $p(d, p|v) \propto p(d, p) \times p(v|d, p)$ (hereinafter referred to as Eqn. 2).

The left-hand side of Eqn. 2 may represent the posterior conditional PDF characterizing the uncertainty in input variables d and p, given all the information available at a given time (e.g., observation of a specific set of measurements v); it is proportional to (symbol $\propto$) the product of a prior PDF $p(d, p)$ and a likelihood function $p(v|d, p)$. The prior PDF quantifies the uncertainty in the model inputs d and p prior to making measurements of the system, and it is constrained by general knowledge of the production system, including reservoir, flow lines and the wells or platforms. The likelihood function characterizes how well any choice of d and p fits the data measured about the network. Eqn. 2 provides a way to combine: (1) prior information via $p(d, p)$, and (2) actual measurements v via $p(v|d, p)$.

Figure 7A:
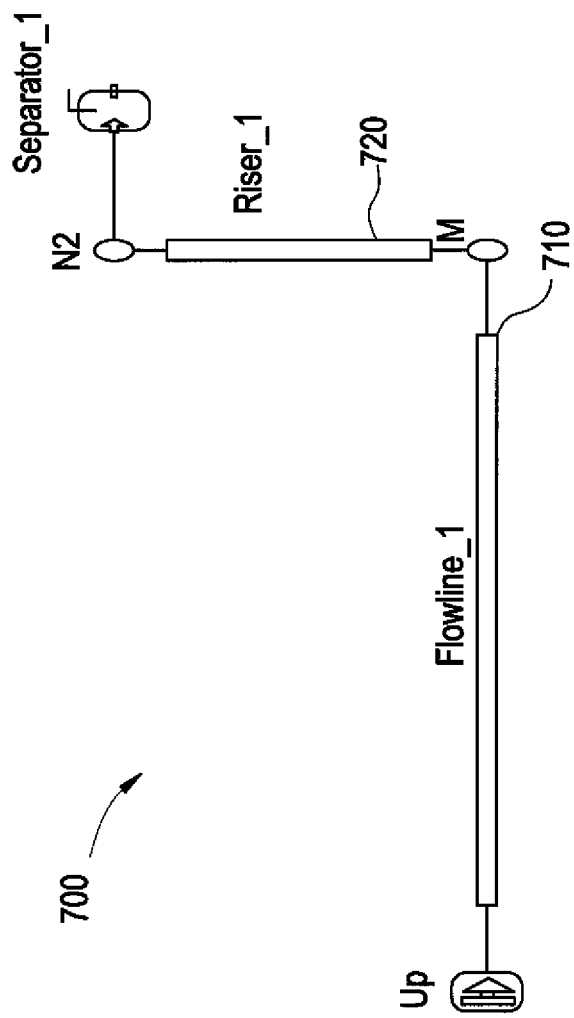

FIGS. 7A-7D illustrate an application of Eqn. 2, and provide a simplified example of a Bayesian probability updating computation using a production system model. Referring now to FIG. 7A, a PIPESIM model 700 for a single well with a 6 mile long subsea tie-back 710 into a 3000 foot riser 720 is shown. Models generated by other flow simulation software known in the art may also be used. In this exemplary embodiment, the separator inlet pressure is set at 50 psia and the liquid flow rate is 30,000 STDB/D. These two deterministically known variables may be included in the set of PIPESIM model input variables d shown in FIG. 4 and Eqn. 2.

To keep the illustration of Eqn. 2 simple, this example assumes the following: (1) the input variables d are known with certainty, and (2) there is only a single unknown model parameter p in FIG. 4 and Eqn 2. Note that putting all of the model uncertainty into only a single unknown model parameter may be considered an unrealistic case, because an unrealistically large amount of measurement uncertainty should be assumed in order to achieve levels of uncertainty that are illustrative in the Bayesian update computation. In a more realistic case where input variables d are not known with certainty or variable p reflects several unknown model parameters, each of the parameters can take on smaller and more realistic levels of uncertainty to achieve the same effect. However, with several unknown model parameters, the Bayesian update computation would be more complex and more difficult to illustrate.

The single unknown model parameter is taken in this example to be the flow line diameter (the flow line diameter in this example is nominally 8 inches, but may vary over the life of the field due to scaling or other solid buildup). A decrease in effective flow line diameter may cause the upstream flow line pressure to increase, as illustrated in the chart 730 shown in FIG. 7B. The chart 730 may be generated using deterministic PIPESIM modeling, or any other modeling software known in the art. In this example, the upstream flow line pressure 735 plotted in chart 730 is the only variable in the set of PIPESIM model output variables v shown in FIG. 4 and Eqn. 2.

Because input variables d (separator inlet pressure and the liquid flow rate) are assumed to be known with certainty, Eqn. 2 may be simplified as follows: $p(p|v) \propto p(p) \times p(v|p)$ (hereinafter referred to as Eqn. 2a).

This provides a formula by which the prior PDF $p(p)$ for parameter p (here, the flow line diameter) may be updated to obtain the conditional posterior PDF $p(p|v)$ for the flow line diameter, conditioned on the availability of an uncertain measurement of the model output v (here, the upstream flow line pressure).

To begin, we define the prior PDF $p(p)$ for flow line diameter (i.e. the PDF for the flow line diameter before any measurements are made). The flow line diameter may nominally be eight (8) inches. However, as time progresses there is some chance that solids will build up in the flow line and the effective diameter will be less than eight (8) inches. Since solid buildup reduces the diameter gradually, values of flow line diameter slightly smaller than eight (8) inches may be more likely to occur as compared to values of flow line diameter that are much smaller than eight (8) inches.

To capture this behavior, we assume that the prior PDF $p(p)$ for flow line diameter has an exponential form as illustrated in FIG. 7C, and represented quantitatively by the following proportionality (here exp(-x) represents the exponential function $e^{-x}$): $p(p) \propto \exp\{-(8-p)\}$ for $0 \leq p \leq 8$, and is zero otherwise. Referring now to FIG. 7C, numerically computing the mean and standard deviation for this PDF provides the prior (before measurements) estimate of flow line diameter: $7.0 \pm 1.0$ inches. An exemplary embodiment of this is shown in chart 750.

Figure 7D:
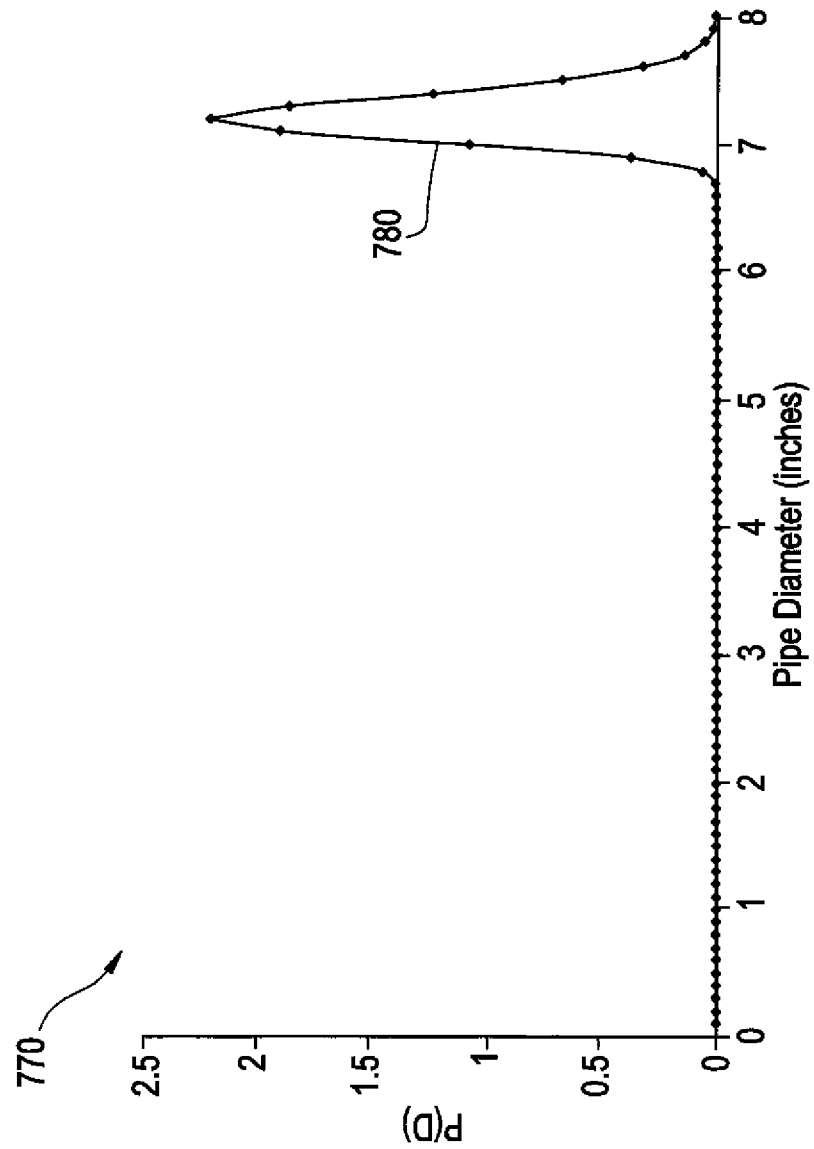

Next, the conditional PDF $p(v|p)$ for the flow line upstream pressure, conditioned on the value of flow line diameter p may be defined. For a given value of flow line diameter p, the deterministic PIPESIM model (i.e. the relationship plotted in chart 730 of FIG. 7B) can be used to compute the upstream pressure. This model result may be denoted as M(p). The actual pressure gauge measurement v, then, is represented as the PIPESIM computed value plus zero-mean (if the additive measurement noise is not zero-mean, the mean value can be combined with the PIPESIM model so that the remaining additive noise is zero mean) additive Gaussian measurement noise having standard deviation $\sigma$, represented quantitatively by the following proportionality: $p(v|p) \propto \exp-\{(v-M(p))/\sqrt{2}\sigma\}^2$ To illustrate with a specific computation, suppose the flow line upstream pressure is measured with an inaccurate pressure gauge at 1450±30 psia (as noted above, the uncertainty in the measurement pressure is assumed to be high because putting all of the model uncertainty into only a single unknown model parameter is a very unrealistic case). The posterior PDF p(p|v) for the flow line diameter conditioned on measurement of the uncertain upstream flow line pressure (Eqn. 2a) is represented by the following proportionality:

$p(p|v=1450) \propto \exp\{-(8-p)\} \times \exp-\{(1450-M(p))/\sqrt{2}\sigma\}^2$ Referring to FIG. 7D, the chart 770 illustrates a posterior conditional PDF p(p|v) for the flow line diameter, given a noisy measurement of the flow line upstream pressure of 1450±30 psia. Chart 770 shows a plot 780 of the posterior conditional PDF p(p|v) for the flow line diameter given a pressure gauge reading v of 1450±30 psia. Note that although the posterior conditional PDF appears to have the shape of a Gaussian PDF, it is observed to be non-symmetric and the previous equation demonstrates that it is not a Gaussian function, and therefore is calculated numerically.

Once this function has been calculated, the posterior mean and standard deviation of the flow line diameter can be computed numerically, to arrive at an estimate with uncertainty for the flow line effective diameter of 7.2±0.2 inches. Note that compared to the prior estimate, the flow line diameter estimate standard deviation is a factor of 5 smaller due to the availability of the noisy flow line upstream pressure measurement.

The Bayesian updating formulas in Eqn 2 and 2a may be applied repeatedly as time progresses and as other measurements are made of the flow line upstream pressure. In an exemplary embodiment, at each time step, the posterior conditional PDF p(p|v) for the flow line diameter (shown in FIG. 7D for the first time step) becomes the new prior PDF (i.e. replaces the PDF shown in FIG. 7C for the first time step).

Continuing with the example of the subsea flow line shown in FIG. 6, in practice, the posterior conditional PDF p(d, p|v) in Eqn. 2 may be calculated using all the available measurements. The posterior conditional PDF in Eqn. 2 may then be sampled using Monte Carlo sampling methods (i.e. randomly generate (d, p) values based on the posterior conditional PDF), and for each (d, p) value, the production system model in Eqn. 1 is computed, thereby generating a (P,T) operating profile.

Repeating this process with Monte Carlo sampling generates a collection of (P,T) operating profiles as illustrated by profiles 608 in FIG. 6, and a larger set of Monte Carlo simulations may be used to generate a PDF for (P,T) at each point along the flow line that are all constrained with the available data, which is discussed in view of FIG. 8 below.

Figure 8:
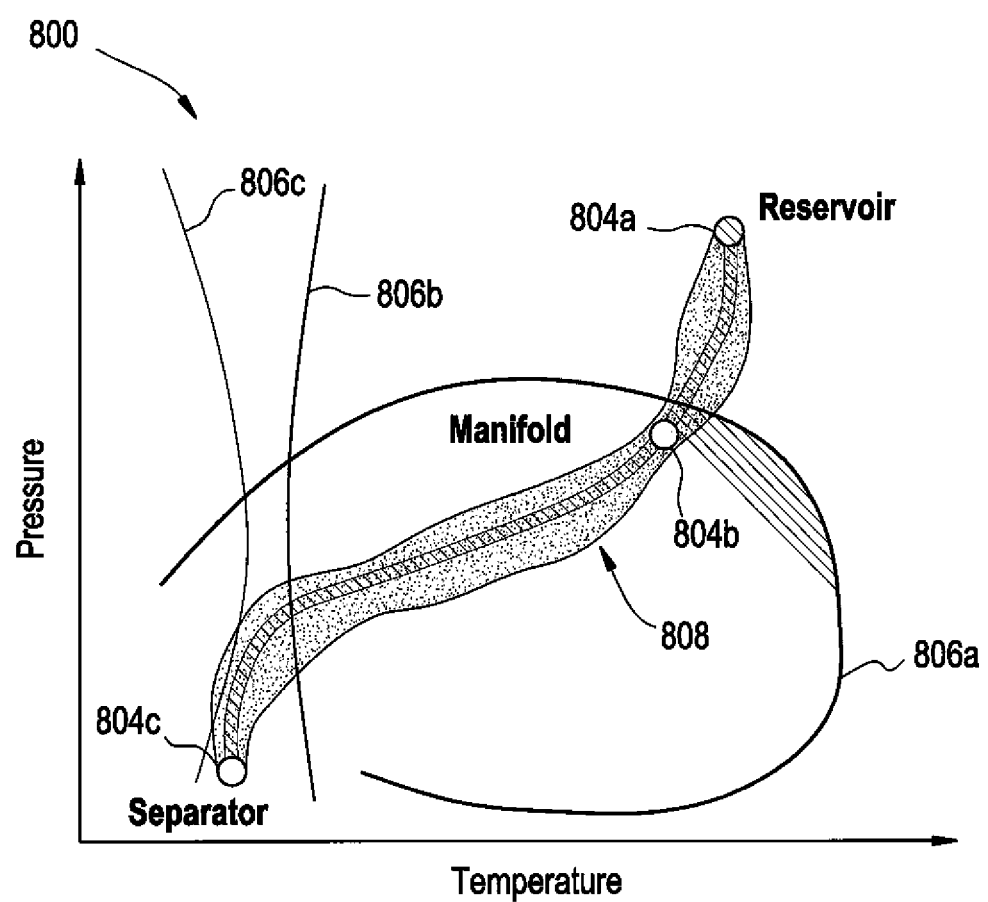
FIG. 8 illustrates a chart of pressure-temperature phase envelopes with super-imposed collection of posterior probabilistically sampled operating profiles according to an embodiment of the present disclosure.

FIG. 8 shows a chart 800 that illustrates pressure-temperature phase envelopes with a super-imposed collection of posterior probabilistically sampled operating profiles according to an embodiment of the present disclosure. The dots 804a-c represent the (P,T) data at the points corresponding to the dots 102a-c, 506a-c, 606a-c in the FIGS. 1, 5 and 6 respectively. A phase envelope 806a, a wax envelope 806b, and a hydrate envelope 806c are also shown in FIG. 8.

The resulting (P,T) conditional PDFs, as illustrated by the cloud 808 in FIG. 8, are indicative of the final uncertainty of the model output operating profiles, based on all the data available at anytime. More dense (darker) areas of the cloud 808 represent operating profiles that are more likely to occur, while less dense (lighter) areas of the cloud 808 represent operating profiles that are less likely to occur.

Availability of a posterior conditional PDF of (P,T) profiles allows direct incorporation of uncertainty and risk into subsequent decisions about potentially costly flow line intervention. For example, the posterior conditional PDF may be used to perform a risk analysis, or to make an economic decision according to embodiments of the present disclosure. In an example scenario, chart 800 shows that (P,T) profiles that are completely to the right of hydrate equilibrium envelope 806c do not form hydrates. If an operator wanted to estimate an amount of investment to remediate or protect against the formation of hydrates, he might identify the portions of the cloud 808 that cross the hydrate equilibrium envelope 806c, and he could determine what action would be required to prevent hydrate formation at such points. For example, when such operating profiles are likely to occur, the operator might inject possibly costly fluids or chemicals that could inhibit the formation of hydrates. Another option is that the operator may circulate warmer fluids at such operating profile in order to keep the temperature of the fluid above the hydrate formation temperature during operational procedures, such as wells startups (transient phenomena). In contrast to a deterministic distribution of (P,T) operating profiles 508, a probabilistic distribution of (P,T) operating profiles 808 allows the operator to evaluate intervention scenarios and make economic decisions based on the likelihood of probable outcomes. It should be understood that the foregoing is merely an exemplary scenario, and that the posterior conditional PDF may be used to perform risk analysis and/or make economic decisions with respect to other situations known in the art.

Figure 9:
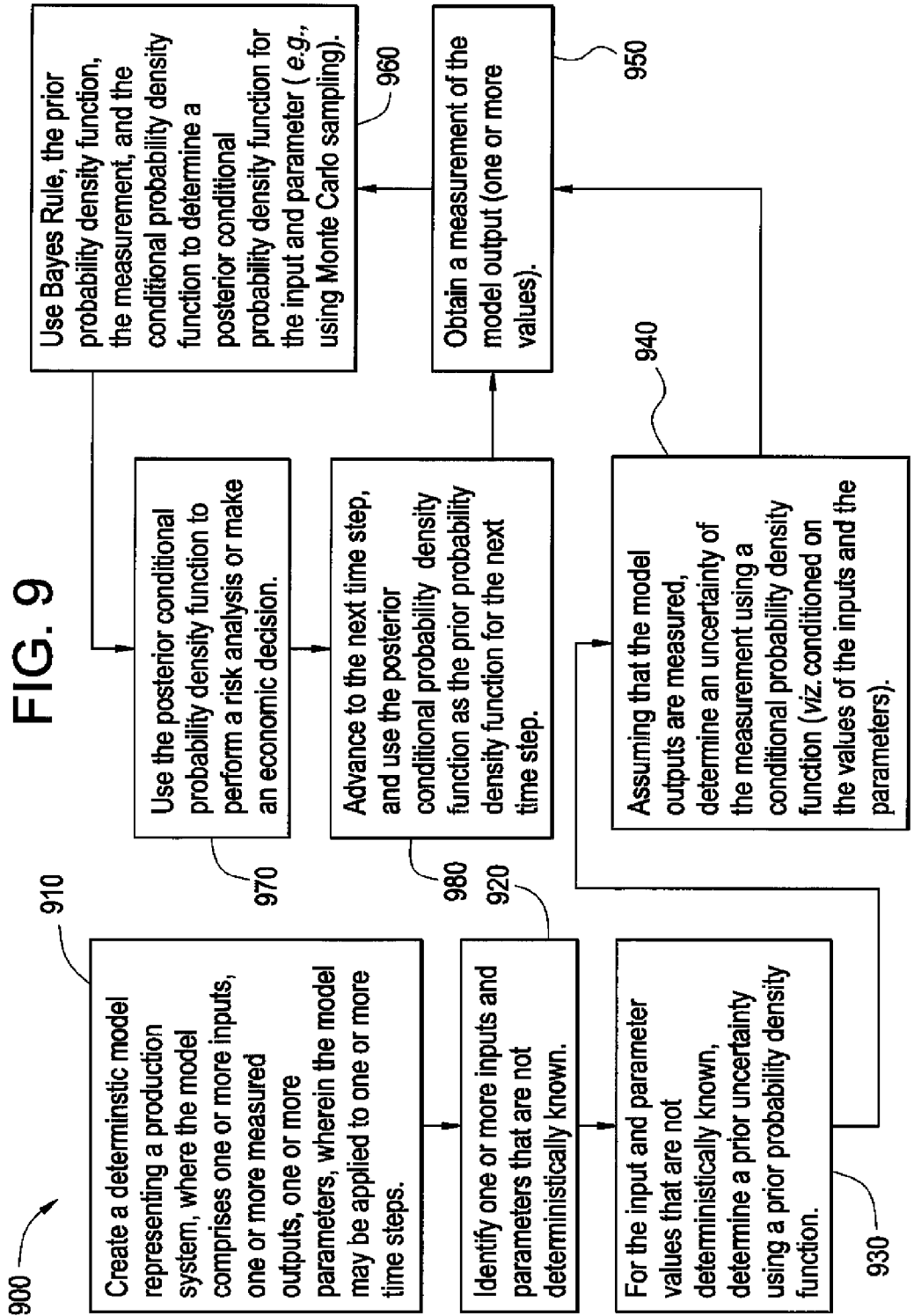
FIG. 9 illustrates a method according to an embodiment of the present disclosure.

FIG. 9 illustrates a method 900 of modeling a well network system. A production system may include one or more wells, one or more production networks, or any combination of one or more wells and/or one or more production networks. In an embodiment, a production system may include one or more surface facility models. All or a portion of the method 900 may implement exemplary embodiments of the present disclosure. The method 900 may include a block 910 that includes creating a model representing a production system. The model may include one or more inputs, one or more outputs, and one or more parameters. A set of inputs, outputs, and parameters may be applied to one or more timesteps. Block 920 may include identifying one or more of the inputs and parameters as not deterministically known. It should be understood that one or more of the inputs and parameters may be deterministically known. At block 930, for the input and parameter values that are not deterministically known, a prior uncertainty may be determined using a prior probability density function (PDF). Block 940 may include assuming that one of the model outputs is measured, and determining the uncertainty of the measurement using a conditional PDF. The determination of the uncertainty of the measurements may be conditioned on the values of the inputs and the parameters. Method 900 at block 950 may include obtaining a measurement of one of the model outputs. In an embodiment, the measurement may include a plurality of values. Block 960 may include using the prior PDF, the measurement, and the conditional PDF to determine a posterior conditional PDF related to the at least one of the inputs and parameters. Block 960 may use Bayes rule to calculate the posterior conditional PDF. In an exemplary embodiment, block 960 may use Monte Carlo sampling to determine the posterior conditional PDF. In an embodiment, the posterior conditional PDF may be used to perform a risk analysis or to make an economic decision, as shown at block 970. Block 980 may include advancing to the next time step, and using the posterior conditional PDF as the prior PDF for the next time step. In an embodiment of the present disclosure, using the posterior conditional PDF as the prior PDF for the next time step comprises determining a prior PDF of at least one of the outputs. The method 900 may then loop between blocks 950, 960, 970 and 980 for one or more time steps.

Figure 10:
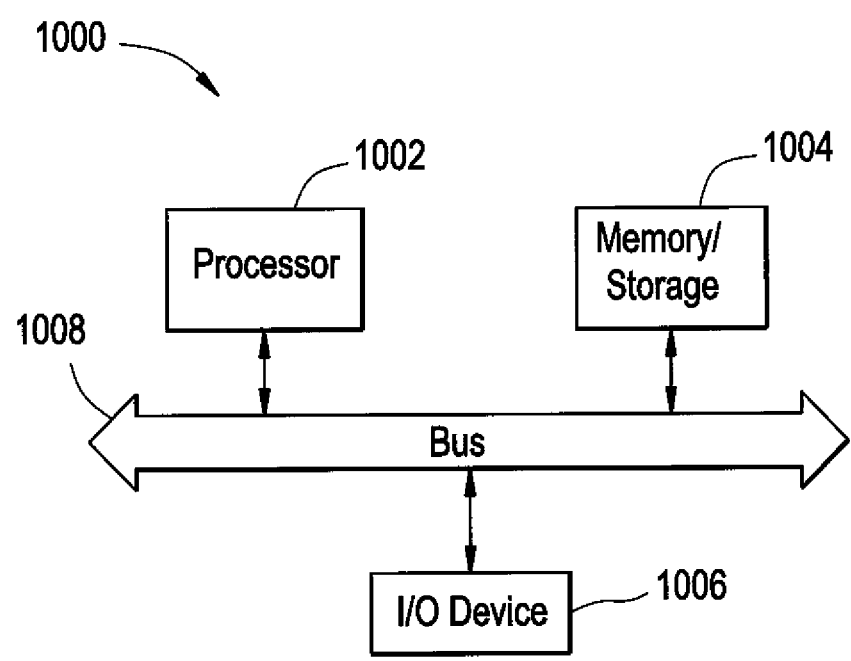
FIG. 10 illustrates an example computing device that may be used to implement embodiments of the present disclosure.

FIG. 10 illustrates an example computing device 1000 that can implement the various techniques described herein, and which may be representative, in whole or in part, of the elements described herein. Computing device 1000 is only one example of a computing device and is not intended to suggest any limitation as to scope of use or functionality of the computing device and/or its possible architectures. Neither should computing device 1000 be interpreted as having any dependency or requirement relating to any one or combination of components illustrated in the example computing device 1000.

Computing device 1000 may include one or more processors or processing units 1002, one or more memory and/or storage components 1004, one or more input/output (I/O) devices 1006, and a bus 1008 that allows the various components and devices to communicate with one another. Bus 1008 may represent one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 may represent one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth).

One or more input/output devices 1006 allow a user to enter commands and information to computing device 1000, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In an embodiment, computer storage media may store instructions that may be executed by a processor in order to implement techniques described herein. For example, computer storage media may store instructions, that when executed by a processor, may implement aspects of method 900 shown in FIG. 9.

Although only a few exemplary embodiments of the present disclosure have been described in detail above, those skilled in the art will readily appreciate that many modifications are possible in the exemplary embodiments without materially departing from the novel teachings and advantages of this disclosure. For example, embodiments of the present disclosure may relate to transient as well as steady-state models.

What is claimed is:

1. A method of modeling a production system, comprising:
   creating a deterministic model representing the production system, the model comprising one or more inputs and parameters that are not deterministically known, and one or more outputs;
   using a prior probability density function to determine a prior uncertainty related to a first of at least one of the inputs and parameters that are not deterministically known;
   obtaining a measurement related to a first of the outputs, wherein the first of the outputs is assumed to have a measurement uncertainty that is determined using a conditional probability density function, and wherein the conditional probability density function is conditioned on at least one of the inputs or parameters that are not deterministically known;
   determining, by a computer processor, a posterior probability density function of the first of at least one of the inputs and parameters that are not deterministically known using the prior probability density function, the measurement, and the conditional probability density function;
   generating, by the computer processor based on the posterior probability density function and using a pre-determined statistical sampling method, a plurality of posterior probabilistically sampled pressure-temperature operating profiles of the production system;
   performing a risk analysis based on the plurality of posterior probabilistically sampled pressure-temperature operating profiles and a pre-determined pressure-temperature phase envelope to generate a risk analysis result, wherein the pre-determined pressure-temperature phase envelope represents a production problem of the production system; and
   presenting, to a user, the risk analysis result.

2. The method of claim 1, wherein the model further comprises a plurality of timesteps, and further comprising:
   using a first posterior probability density function of a first timestep of the plurality of timesteps as the prior probability density function when determining the posterior probability density function of a second timestep of the plurality of timesteps.

3. The method of claim 1, further comprising performing an operation of the production system based on the risk analysis result to intervene in the production problem.

4. The method of claim 1, wherein determining the posterior probability density function comprises randomly generating the posterior probability density function based upon the first of at least one of the inputs and parameters that are not deterministically known.

5. The method of claim 4, wherein randomly generating the posterior probability density function comprises using Monte Carlo sampling to determine the posterior probability density function.

6. The method of claim 1, wherein the model is at least one chosen from a group consisting of transient models and steady-state models.

7. The method of claim 1, further comprising making an economic decision based upon the posterior probability density function.

8. A non-transitory computer-readable medium having a set of computer-readable instructions residing thereon that, when executed, perform acts comprising:
creating a deterministic model representing a production system, the model comprising one or more inputs and parameters that are not deterministically known, and one or more outputs;
using a prior probability density function to determine a prior uncertainty related to a first of at least one of the inputs and parameters that are not deterministically known;
obtaining a measurement related to a first of the outputs, wherein the first of the outputs is assumed to have a measurement uncertainty that is determined using a conditional probability density function, and wherein the conditional probability density function is conditioned on at least one of the inputs or parameters that are not deterministically known;
determining a posterior probability density function of the first of at least one of the inputs and parameters that are not deterministically known using the prior probability density function, the measurement, and the conditional probability density function;
generating, based on the posterior probability density function and using a pre-determined statistical sampling method, a plurality of posterior probabilistically sampled pressure-temperature operating profiles of the production system;
performing a risk analysis based on the plurality of posterior probabilistically sampled pressure-temperature operating profiles and a pre-determined pressure-temperature phase envelope to generate a risk analysis result, wherein the pre-determined pressure-temperature phase envelope represents a production problem of the production system; and
presenting, to a user, the risk analysis result.

9. The non-transitory computer-readable medium of claim 8, wherein the model further comprises a plurality of timesteps, and further comprising:
using a first posterior probability density function of a first timestep of the plurality of timesteps as the prior probability density function when determining the posterior probability density function of a second timestep of the plurality of timesteps.

10. The non-transitory computer-readable medium of claim 8, wherein the acts further comprise performing an operation of the production system based on the risk analysis result to intervene the production problem.

11. The non-transitory computer-readable medium of claim 8, wherein determining the posterior probability density function comprises randomly generating the posterior probability density function based upon the first of at least one of the inputs and parameters that are not deterministically known.

12. The non-transitory computer-readable medium of claim 11, wherein randomly generating the posterior probability density function comprises using Monte Carlo sampling to determine the posterior probability density function.

13. The non-transitory computer-readable medium of claim 8, wherein the model is at least one chosen from a group consisting of transient models and steady-state models.

14. The non-transitory computer-readable medium of claim 8, further comprising making an economic decision based upon the posterior probability density function.

15. A computing device comprising:
a memory;
one or more processors operatively coupled to the memory;
functionality operable by the processors to perform a method, the method comprising:
creating a deterministic model representing a production system, the model comprising one or more inputs and parameters that are not deterministically known, and one or more outputs;
using a prior probability density function to determine a prior uncertainty related to a first of at least one of the inputs and parameters that are not deterministically known;
obtaining a measurement related to a first of the outputs, wherein the first of the outputs is assumed to have a measurement uncertainty that is determined using a conditional probability density function, and wherein the conditional probability density function is conditioned on at least one of the inputs or parameters that are not deterministically known;
determining a posterior probability density function of the first of at least one of the inputs and parameters that are not deterministically known using the prior probability density function, the measurement, and the conditional probability density function;
generating, based on the posterior probability density function and using a pre-determined statistical sampling method, a plurality of posterior probabilistically sampled pressure-temperature operating profiles of the production system;
performing a risk analysis based on the plurality of posterior probabilistically sampled pressure-temperature operating profiles and a pre-determined pressure-temperature phase envelope to generate a risk analysis result, wherein the pre-determined pressure-temperature phase envelope represents a production problem of the production system; and
presenting, to a user, the risk analysis result.

16. The computing device of claim 15, wherein the model further comprises a plurality of timesteps, and further comprising:
using a first posterior probability density function of a first timestep of the plurality of timesteps as the prior probability density function when determining the posterior probability density function of a second timestep of the plurality of timesteps.

17. The computing device of claim 15, wherein the method further comprises performing an operation of the production system based on the risk analysis result to intervene the production problem.

18. The computing device of claim 15, wherein determining the posterior probability density function comprises randomly generating the posterior probability density function based upon the first of at least one of the inputs and parameters that are not deterministically known.

19. The computing device of claim 18, wherein randomly generating the posterior probability density function comprises using Monte Carlo sampling to determine the posterior probability density function.

20. The computing device of claim 15, wherein the model is at least one chosen from a group consisting of transient models and steady-state models.

* * * * *